Dec. 25, 1934.  E. E. HARRIS  1,985,498
COMBINED SALT AND PEPPER SHAKER
Filed Aug. 16, 1933
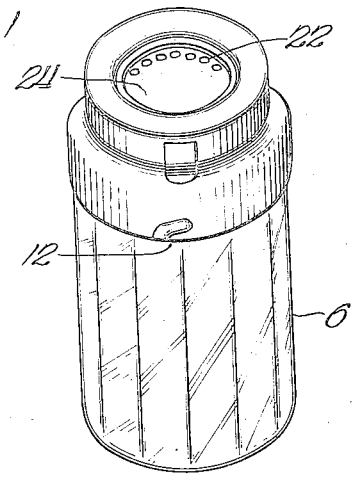
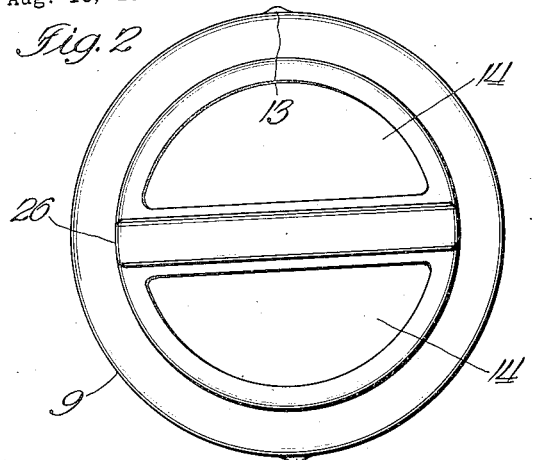
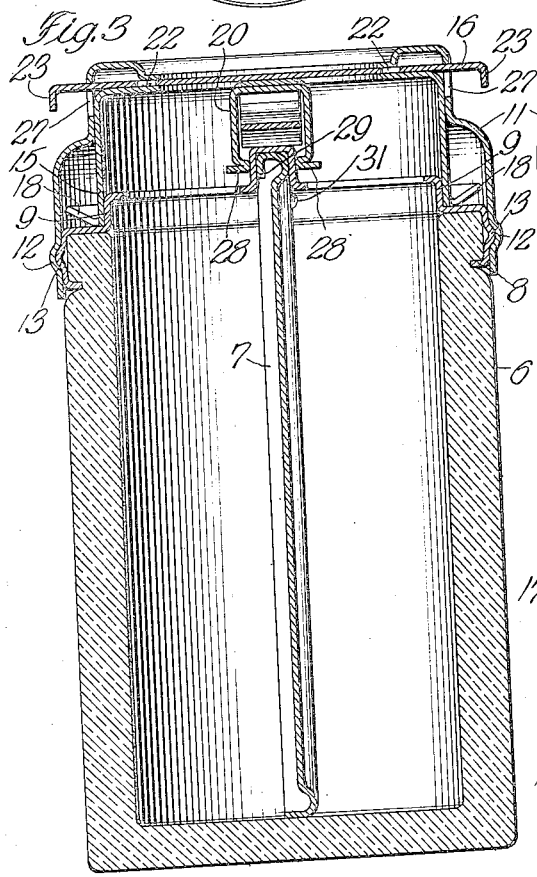
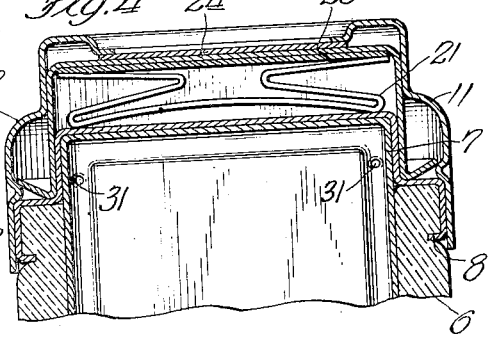
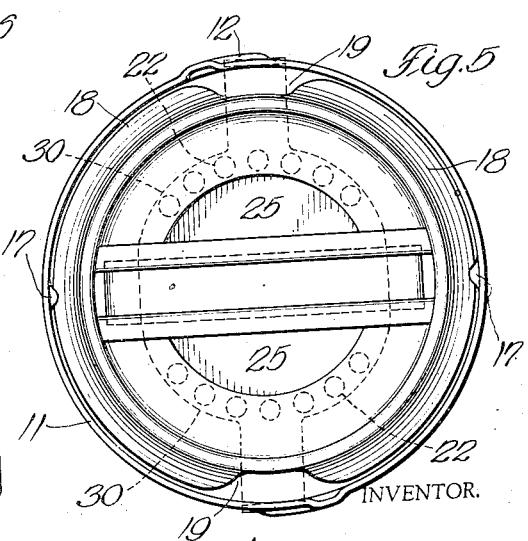
INVENTOR.
BY *Edward E Harris*
ATTORNEY.

Patented Dec. 25, 1934

1,985,498

UNITED STATES PATENT OFFICE 1,985,498

COMBINED SALT AND PEPPER SHAKER

Edward E. Harris, Chicago, Ill.

Application August 16, 1933, Serial No. 685,338

6 Claims. (Cl. 65—45)

This invention relates to an improved salt and pepper shaker adapted to deliver the contents in small quantities and is particularly designed to provide an improved device of this character wherein different articles, such as salt and pepper and the like may be separately held within a single container and delivered singly therefrom, in a convenient and efficient manner. The invention further contemplates the provision of a sanitary device of this character: a further object within the contemplation is that both compartments can be completely closed at the same time.

A further object within the contemplation of the invention is the provision of means for preventing mixing of the contents of the shaker.

A further object within the contemplation is that the shut-off member is held under a spring tension.

A further object within the contemplation is that when cap is released from the body, shut-off member may be taken out and all sides of cap and shut-off member can be cleaned and reassembled in a simple and efficient manner.

A further object within the contemplation of the invention is that a special construction of a container and partition has been provided that will form an extension of the partition in the region of the socket. As the upper end of the partition is inserted in the socket said socket having perpendicular walls and the partition having perpendicular sides and ends and works like a stopper in a bottle, playing up and down as the bottoms vary in thickness, and will prevent the mixing of the contents over the partition inside of the container over the partition wall. If decided variation of the internal dimensions of the container is made inside from top to bottom, that so often happens in the manufacture of glassware.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention. A practical embodiment of the invention is shown in the accompanying drawing wherein:

Figure 1 is a perspective view with all parts assembled.

Figure 2 is a top view of the body with cap removed, but with cap 9 in place.

Figure 3 is a cross-section view of the device cut across at right angles to the partition with all parts assembled.

Figure 4 is a cross-section view of the device cut through by the side of the partition wall with lower part of the body cut away.

Figure 5 is a plan view of the bottom of the cap with all parts assembled.

Referring to the drawing by numerals of reference, in carrying out the invention there is provided a suitable preferably cylindrical body or container No. 6, made of glass or other suitable material, and having a diametrically disposed partition No. 7, extending from the bottom of the container and projecting above the mouth or top thereof.

The outer surface of container 6 is made with a groove No. 8 in which the lower apron on cap No. 9 is rolled and becomes a part of the body of the container and bears down upon the partition No. 7, and holds the partition in place.

The container cap 9 has two outwardly embossed projections 13—13 near its upper end and on its outer surface upon which outer cap No. 11 is secured to the body by two L shaped outwardly embossed channels 12—12; cap No. 9 has two top openings 14—14 through which the body is filled.

Intermediate cap No. 15 holds slide No. 16 in place. When slots 19—19 in intermediate cap 15 are inserted astride embossed part 17—17 on the outer cap 11 and turned to the position shown in Figure No. 5, the intermediate cap and outer cap will be assembled the same can be disassembled by turning slots 19—19 to embossed parts 17—17 and both caps 11 and 15 may then be released.

Cap No. 11 has two openings 27—27 through which slide or shut-off member 16 may be taken out and replaced. When slide No. 16 is shifted to a position where perforations 22—22 rest underneath the opposite edges of the cap opening, the container will be entirely closed. When ears 23—23 of slide No. 16 are shifted until either ear 23 or 23 rests in slots 27 or 27, the same forms a vice versa communication with both compartments.

Spring No. 21 is assembled in channel member No. 20 and bears down upon the upper end of the partition and thereby forms a spring resistance by pressing intermediate cap No. 15 up against shut-off member No. 16 and outer cap No. 11 and prevents any possible chance of the contents of one compartment passing over into the other compartment and becoming mixed inside the top.

Member 20 has two forked shaped prongs downwardly facing, each with an inwardly formed rib or shoulder, which limits the downward movement of spring No. 21 and also prevents the contents from becoming mixed when placed astride the upper end of the partition together with all parts of the cap assembled, as member 20 fits close to the sides of the partition wall.

In making glassware, it is either gathered with a rod by hand or an automatic machine; if by either a decided difference in the height of the article will be made inside for the reason that the same amount of glass can seldom be gathered and deposited in the moulds, and as the outer shoulder of the moulds limits the upward flow of the glass, thereby causing the surplus glass, if there be a surplus, to be deposited in the inside and bottom of the container and thereby making the distance from top to bottom shorter or longer. The above-mentioned method fully solves the problem in question, which is of vital importance in the production of this article.

In my patent of June 4th, 1929, No. 1,715,754 this problem is specifically pointed out. This one, however, is far cheaper to make and has a better appearance. It is a decided improvement and the results are accomplished by a different method, and while a solid glass partition is hard to make, however, if a solid glass partition is made, the construction herein shown or described will take care of the shrinkage or the variation of the glass partitions also.

Slide No. 16 is made so that when cap No. 15 is taken out of cap No. 11, cap No. 15 no longer limits the movements of slide No. 16 with ears 23—23; slide No. 16 then may be shifted until shoulder No. 30 on slide No. 16 rests against the side wall of cap No. 11; then ear or ears 23—23 will pass inside of cap No. 11 and may be taken out.

The two flanges 18—18 on cap No. 15 are located on its side, at right angles to its side wall.

When intermediate cap No. 15 is in place, the movement of slide No. 16 is limited by cap No. 15. When one of the ears 23—23 rests in slot 27 or 27 such ear lies flush with the outer surface of cap No. 11.

The two embossed projections on partition 7 31—31 holds partition 7 tight on bottom of container, said projections to be made after partition is pressed in place in the container.

Having thus described my invention, what I claim as new and what I seek protection for by Letters Patent is,

I claim:

1. A combination salt and pepper container, open at one end, a partition wall within the container forming compartments therein, a skirted cap overhanging the open end of the container, means to lock the cap to the container, a closure member in the cap having outlet perforations communicating with both compartments on opposite sides of the partition wall, a dome fitted in the cap to seat against the closure member, a channel member, the said dome resting upon the channel member which has two downwardly facing members to engage and embrace the upper end of the partition wall, the said downwardly facing members, within the dome, having a yieldable member assembled between the said members in the channel to seat upon the top of the partition to press the channel member, the dome and closure member up against the cap, the said dome and closure member being adapted to be disengaged from the cap.

2. A combination salt and pepper container, open at one end, a partition wall within the container forming compartments therein, a skirted cap overhanging the open end of the container, means to lock the cap to the container, a closure member in the cap having outlet perforations communicating with both compartments on opposite sides of the partition wall, a dome fitted in the cap to seat against the closure member, a channel member, the said dome resting upon the channel member which has two downwardly facing members to engage and embrace the upper end of the partition wall, the said cap having internally formed projections, formed from the said cap skirt, the dome having outwardly extending projections formed from the walls of the dome, the said outwardly extending projections formed from the said walls of the dome rest upon the said internally formed projections formed from the said cap skirt and thereby lock the dome and closure member in the cap while the cap is disengaged from the container, the said downwardly facing members of the channel member having a spring assembled between the said members, the said spring to be seated upon the top of the partition and press the channel member, dome and closure member up against the cap, the dome and closure member being adapted to be disengaged from the cap.

3. A combination salt and pepper container, open at one end, a partition wall within the container forming compartments therein, a skirted cap overhanging the open end of the container, means to lock the cap to the container, a closure member in the cap having outlet perforations on opposite sides of the partition wall, communicating with both compartments, a dome fitted in the cap to seat against the closure member, a channel member, the said dome resting upon the channel member which has two downwardly facing members to engage and embrace the upper end of the partition wall, the said downwardly facing members of the channel member having a spring assembled between the said members to seat upon the top of the partition and press the channel member, dome and closure member up against the cap, the said downwardly facing members, within the said dome, having two internally formed ribs, formed from the sides of the said members, one rib on each member, upon said ribs the sides of the spring are seated, and thereby limit the downward movement of the spring while the cap is disengaged from the container, the said cap skirt having internally formed projections, formed upon opposite sides of the said cap skirt and the dome having externally formed projections formed upon the opposite walls of the said dome, the said externally formed projections upon the said walls of the dome seat upon the said internally formed projections formed from the said cap skirt and thereby lock the dome and closure member in the cap while the cap is disengaged from the container, the channel member, dome and closure member being adapted to be disengaged from the cap.

4. A combination salt and pepper container, open at one end, a partition wall within the container forming compartments therein, a skirted cap overhanging the open end of the container, means to lock the cap to the container, a closure member in the cap having outlet perforations on opposite sides of the partition wall, communicating with both compartments, a dome fitted in the cap to seat against the closure member, a channel member, the said dome resting upon the channel member which has two downwardly facing members thereon, the said members to engage and embrace the upper end of the partition wall, the said members in the dome having a yieldable member assembled between the said members, the said yieldable member to seat upon the top of the partition and press the dome and closure member up against the cap and the said downwardly facing members on the channel member within the said dome having two internally formed shoulders one shoulder formed from each of the said members, upon which shoulders the sides of the said yieldable member rest and are thereby limited as to their downward movement while the channel member is disengaged from the container, the dome and closure member being adapted to be disengaged from the cap.

5. A combination salt and pepper container, open at one end, a partition wall within the container forming compartments therein, a skirted cap overhanging the open end of the container, means to lock the cap to the container, a closure member in the cap having outlet perforations on opposite sides of the partition wall communicating with both compartments, a dome fitted in the cap to seat against the closure member, a channel member, the said dome resting upon the channel member which has two downwardly facing projections for the reception of the upper end of the partition wall, the cap having inwardly extending projections formed on the opposite sides of the said cap skirt, the dome having an outwardly projecting flange formed on its side wall, said flange having notches adapted to register with the said inwardly extending projections to permit assemblage of the cap and dome, the said outwardly projecting flange of the said dome resting upon the inwardly extending projections formed upon the said cap skirt after assemblage and thereby locking the closure member and the dome in the cap.

6. A combination salt and pepper container open at one end and having a partition wall forming compartments therein, a ring upon the open end of the container, a bridge across the ring having depending edges to engage and embrace the upper end of a partition, a skirted cap overhanging the open end of the container, there being openings in the cap for communication with said compartments on opposite sides of the partition wall, means carried by the cap between said openings for embracing and tightly gripping said bridge to prevent intermixing of the contents of the respective compartments and means to lock the cap to the container.

EDWARD E. HARRIS.